(12) United States Patent
Ackley et al.

(10) Patent No.: US 10,811,762 B2
(45) Date of Patent: **\*Oct. 20, 2020**

(54) RFID TAG BATTERY CHARGING METHOD

(71) Applicant: INTERMEC, INC., Lynnwood, WA (US)

(72) Inventors: H. Sprague Ackley, Seattle, WA (US); Pavel Nikitin, Seattle, WA (US)

(73) Assignee: Intermec, Inc., Lynnwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/270,711

(22) Filed: Feb. 8, 2019

(65) Prior Publication Data

US 2019/0173155 A1 Jun. 6, 2019

Related U.S. Application Data

(63) Continuation of application No. 14/991,218, filed on Jan. 8, 2016, now Pat. No. 10,236,554.

(51) Int. Cl.
*H01Q 1/22* (2006.01)
*H02J 7/00* (2006.01)
(Continued)

(52) U.S. Cl.
CPC ......... *H01Q 1/2225* (2013.01); *G06K 19/071* (2013.01); *G06K 19/0704* (2013.01);
(Continued)

(58) Field of Classification Search
CPC .................................................. H01Q 1/2225
(Continued)

(56) References Cited

U.S. PATENT DOCUMENTS 5,300,875 A 4/1994 Tuttle
6,944,424 B2 9/2005 Heinrich et al.
(Continued)

FOREIGN PATENT DOCUMENTS

WO 2008/010890 A2 1/2008

OTHER PUBLICATIONS

Decision to Grant for European Application No. 17150324.6, dated Sep. 5, 2019, 6 pages.
(Continued)

*Primary Examiner* — Jerry D Robbins
(74) *Attorney, Agent, or Firm* — Alston & Bird LLP (57) ABSTRACT

A trickle-charged RFID device includes a main antenna receiving wireless interrogator signals from one or more RFID readers, a power harvester connected with the main antenna to obtain power from the wireless interrogator signals, and an intermediate storage device connected to the power harvester to collect trickle flows of unused power harvested from wireless interrogator signals received by the RFID device that lack an inquiry for the device. The RFID device further includes a primary storage device, into which the intermediate storage device discharges its collection of trickle flows of unused power when the collection reaches a predetermined threshold level, which recharges power lost from the main storage device. The intermediate storage device can include one or more capacitors including supercapacitors, and the main storage device can include a rechargeable battery, such that the effective life of the main storage device is extended from the collected trickle flows.

20 Claims, 7 Drawing Sheets

(51) Int. Cl.
*G06K 19/07* (2006.01)
*H04B 5/00* (2006.01)

(52) U.S. Cl.
CPC .......... *G06K 19/0709* (2013.01); *H02J 7/007* (2013.01); *H02J 7/0068* (2013.01); *H04B 5/0062* (2013.01)

(58) Field of Classification Search
USPC ........................................................ 320/107
See application file for complete search history.

(56) References Cited

U.S. PATENT DOCUMENTS

| | | | | |
|---|---|---|---|---|
| 7,081,693 | B2* | 7/2006 | Hamel | B60C 23/0411 307/151 |
| 7,408,456 | B2* | 8/2008 | Whitesmith | G01S 13/751 340/500 |
| 7,724,145 | B2 | 5/2010 | Batra et al. | |
| 8,228,194 | B2* | 7/2012 | Mickle | G06K 19/0707 340/572.1 |
| 8,364,077 | B2* | 1/2013 | Koyama | G01S 5/0027 340/10.1 |
| 8,427,279 | B2* | 4/2013 | Gravelle | G06K 7/016 340/10.1 |
| 8,621,245 | B2* | 12/2013 | Shearer | H04B 1/1607 713/300 |
| 8,810,369 | B2 | 8/2014 | Ackley | |
| 9,825,674 | B1* | 11/2017 | Leabman | H02J 5/005 |
| 2006/0094425 | A1 | 5/2006 | Mickle et al. | |
| 2012/0242453 | A1* | 9/2012 | Delgado | G06K 19/0705 340/10.1 |
| 2012/0256492 | A1* | 10/2012 | Song | H02J 7/025 307/66 |
| 2014/0354412 | A1 | 12/2014 | Ackley | |

OTHER PUBLICATIONS

Intention to Grant for European Application No. 17150324.6, dated May 24, 2019, 6 pages.
Notice of Allowance for U.S. Appl. No. 14/991,218, dated Nov. 5, 2018, 10 pages.
Office Action for U.S. Appl. No. 14/991,218, dated Dec. 15, 2017, 30 pages.
Office Action for U.S. Appl. No. 14/991,218, dated Jul. 12, 2018, 37 pages.
May 30, 2017 Search Report issued in European Patent Application No. 17150324.6.
Parks et al; "A Wireless Sensing Platform Utilizing Ambient RF Energy;" IEEE Topical Meeting on Wireless Sensor Networks (WiSNET); Jan. 20-23, 2013; Austiin, TX; 4 pp.
Naderiparizi et al; "WISPCam: A Battery-Free RFID Camera:" IEEE RFID; Apr. 15-17, 2015; 8 pp.
Gabay; "Supercapacitor Options for Energy-Harvesting Systems," Digi-Key Electronics; Aug. 7, 2013; retreived from https://www.digikey.com/en/articles/techzone/2013/aug/supercapacitor-options-for-energy-harvesting-systems.
"Power Management Controller with Energy Harvesting Interface," EM Microelectronic; EM8500-DS; Version 1.0; Jul. 9, 2015; 34 pp.
"LTC3105—400mA Step-Up DC/DC Converter with Maximum Power Point Control and 250mV Start-Up;" Linear Technology; retrieved from http://www.linear.com/product/LTC3105 on Nov. 9, 2015.
"BQ25504—Ultra Low Power Boost Converter with Battery Management for Energy Harvester: Nano-Power Management" Texas Instruments; retreived from http://www.ti.com/product/bq25504 Nov. 9, 2015.
"MAX17710: Energy-Harvesting Charger and Protector—Industry's First Complete Power-Management IC Dedicated to Energy Harvesting;" retreived from https://www.maximintegrated.com/en/products/power/battery-management/MAX17710.html Nov. 9, 2015.
"EnerChip Energy Processor CBC915;" Cymbet Corporation; retreived from http://www.cymbet.com/products/enerchip-energy-processor.php Nov. 9, 2015.
Zhao et al; "NFC-WISP: A Sensing and Computationally Enhanced Near-Field RFID Platform;" IEEE International Conference on RFID; Apr. 15-17, 2015; 8 pp.
Richmond et al; "Active RFID: Perpetual Wireless Communications Platform for Sensors;" 2012 Proceedings of the ESSCIRC; Nov. 12, 2012; pp. 434-437.
Yeager et al; "Wirelessly-Charged UHF Tags for Sensor Data Collection;" 2008 IEEE International Conference on RFID; Apr. 16-17, 2008; pp. 320-327.
Gabay; "Battery-Charging Controllers for Energy Harvesters;" Digi-Key Electronics; May 1, 2013; 5 pp; retreived from https://www.digikey.com/en/articles/techzone/2013/may/battery-charging-controllers-for-energy-harvesters.

\* cited by examiner

FIGURE 7

RFID TAG BATTERY CHARGING METHOD

CROSS REFERENCE TO RELATED APPLICATIONS

This is a Continuation of application Ser. No. 14/991,218 filed Jan. 8, 2016. The disclosure of the prior application is hereby incorporated by reference herein in its entirety.

BACKGROUND

Active RFID tags include fully active (battery operated) RFID tags and semi-passive (battery-assisted passive) RFID tags. Both of these are discussed in general terms herein, and configurations using power storage mechanisms can often include either device. However, either of these devices can be referred to as a power-enhanced RFID tag, in which stored power from the battery or other storage device is used to enhance RFID operations, provide more efficient power usage, increase tag lifespan, and enhance overall the power-related operations for the RFID tag.

The supplemental power allows active or semi-passive (battery assisted passive) RFID devices be much more effective and versatile compared with purely passive RFID devices. They also have exceptional receive sensitivity when operating in a power-assisted mode versus passive RFID devices. In addition, active or semi-passive (battery assisted passive) RFID devices can perform additional functions under their own power even when not being actively interrogated including collecting sensor data, activating external actuators, and running complex software for cryptography or other purposes. However, active or semi-passive (battery assisted passive) RFID devices are limited in performing their enhanced communications, carrying out supplemental functions and running software due to the limited life of their battery or supplemental power supply.

The battery life limitation for conventional powered, active or semi-passive (battery assisted passive) RFID devices is inherent due to their reliance on standard, non-rechargeable batteries as their supplemental power source. These devices have a limited life based on the initial charge of their batteries and the rate at which they draw power. Typical RFID applications such as globally monitoring the location of 40-foot ocean-going containers are severely constrained, because it is very difficult to manage and service RFID tags in use prior to depletion of the power supply. Larger capacity batteries including using multiple batteries with RFID devices have been tried, but once these batteries begin to discharge, they deteriorate relatively quickly and reach their lifetime limits quickly; albeit, slightly longer than with regular capacity batteries.

There has been much discussion and some demonstration of "harvesting" energy from existing RF fields, but generally these fields are very weak and are insufficient to recharge batteries. Further, conventional rechargeable batteries require a significant potential difference in order to reverse the chemical reactions used to store the electrical energy. There have also been attempts to use super-capacitors to store power instead of rechargeable batteries and, thus, avoid the required large potential difference for recharging batteries. However, capacitors and even super-capacitors are much less effective at storing charge for extended periods compared with batteries.

SUMMARY

Various configurations of trickle-charged RFID device and methods for increasing the useful life of a self-powered, active or semi-passive (battery assisted passive) RFID device are provided. A trickle-charged RFID device can include a main antenna to receive wireless interrogator signals from one or more RFID readers, a power harvester connected with the main antenna to obtain power from the wireless interrogator signals, and an intermediate storage device connected to the power harvester. The intermediate storage device can collect trickle flows of unused, harvested power that is obtained from wireless interrogator signals lacking an inquiry for the device, such as interrogator signals for other RFID devices.

The active or semi-passive (battery assisted passive) RFID device can also include a primary storage device, into which the intermediate storage device can discharge its collection of trickle flows from unused power when the collection reaches a predetermined threshold level. The primary storage device can include a rechargeable battery, and the intermediate storage device can include one or more capacitors, such as super-capacitors. The intermediate storage is able to collect unused trickle flows until it reaches predetermined threshold level having high potential versus for the rechargeable battery, such that it can recharge some of the power drained from the main storage device during use of the active or semi-passive (battery assisted passive) RFID device.

The effective life of the main storage device, such as one or more rechargeable batteries, can be significantly extended based on the high-potential recharge actions of the intermediate storage device provided by the collected trickle flows. Configurations of the RFID device and related methods for extending their useful life can include collecting trickle charge flows from multiple types of harvested unused power including sources other than interrogator signals, such as unmodulated wireless signals. Multiple types of trickle charge flows obtained from multiple sources can provided an enhanced combined flow into the intermediate storage device, which can significantly improve the recharge rate of the main storage device and, thus, significantly extends its useful life and that of the RFID device.

Advantages and features of novelty characterizing inventive aspects pertaining to the subject matter described in the application are pointed out with particularity in the appended claims. To gain an improved understanding of advantages and features of novelty, however, reference can be made to the following descriptive matter and accompanying figures that describe and illustrate various configurations and concepts related to the invention.

BRIEF DESCRIPTION OF THE DRAWINGS

Examples of trickle-charged RFID devices and methods for extending the useful life of self-powered, active or semi-passive (battery assisted passive) RFID devices are illustrated in the figures. The examples and figures are illustrative rather than limiting.

DETAILED DESCRIPTION OF THE DRAWINGS

Described in detail below are example configurations of various trickle-charged RFID devices and methods for increasing the useful life of self-powered, active or semi-passive (battery assisted passive) RFID devices. Some example configurations of trickle-charged, active or semi-passive (battery assisted passive), RFID devices make use of ambient electric fields and inherent means of collecting energy from the fields to provide extended battery life for active or semi-passive (battery assisted passive) and battery-assist RFID tags. Further, example configurations also describe methods of charging a rechargeable battery on an RFID tag that includes a circuit for detecting when the tag is not being actively interrogated, diverting the energy collected on the antenna from the interrogator field to an intermediate storage device (e.g. one or more capacitors), determining when the collected charge is sufficient to induce an increase in battery energy (e.g., recharge), and to discharge the intermediate storage device into the primary storage device, such as a rechargeable battery or arrangement of one or more super-capacitors.

Figure 1:
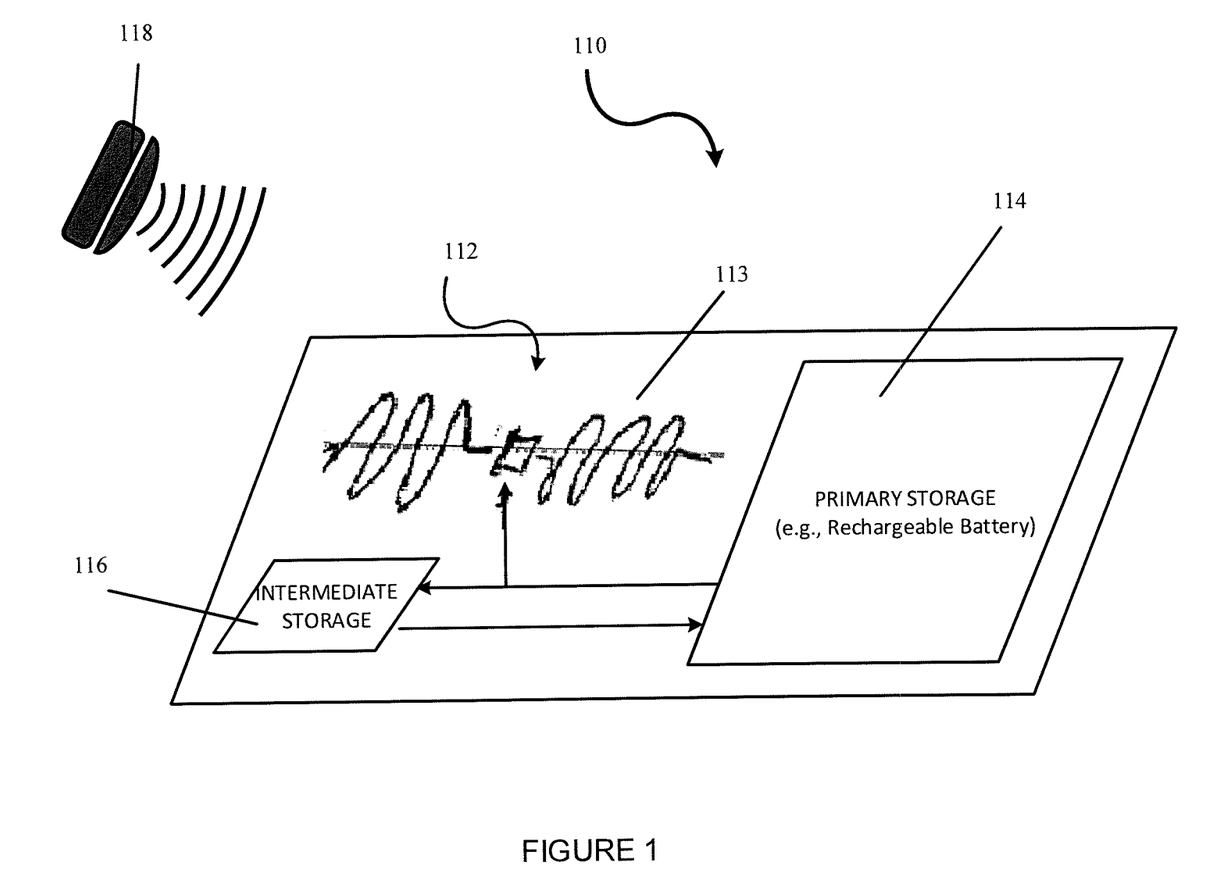
FIG. 1 shows a self-powered, trickle-charged, active or semi-passive (battery assisted passive) RFID device having an intermediate storage device that collects trickle flows of unused power and periodically recharges the rechargeable battery based on the trickle flows it collects in accordance with an example configuration.

Referring now to FIG. 1, a self-powered, trickle-charged RFID device 110 is shown that makes use of the inherent strength of interrogator fields in the immediate vicinity of the RFID tags. These tags are generally sitting in a storage yard or on a ship disposed within interrogator fields for a good deal of their lifetimes, or they are located on cars driving within interrogator range, such as cars that drive past toll road sensors, parking garage sensors, etc. These fields are hundreds of times more intense than other fields, such as FM or 802.11. As such, these RFID tags are exposed to significant energy fields on a regular basis, from which they regularly harvest power in preparation for activation, but fail to use if not activated. When the tag is not activated, the harvested power is typically disposed of without being used and is not saved or stored. As shown in FIG. 1, RFID tag 110 includes an antenna 112 and related circuitry that is already impedance matched to collect energy from the field and already configured to use the collected power if activated like conventional active or semi-passive (battery assisted passive) RFID tags. In such tags, once the tag is "turned on" by the field, the energy is not used until the specific tag is interrogated at which point the energy in the battery is used to amplify the return signal.

However, RFID tag 110 includes an added circuit 113 that diverts unused, excess energy harvested from an interrogator field for use in charging the battery when the tag in idle. The unused, excess energy collected from interrogator field signals provides a low trickle of current that can be captured, stored and used. However, such a trickle of current is not enough to charge a battery directly, especially the large mAh batteries required in some applications, which can be rated at 2000 mAh or greater. As such, RFID tag 110 further includes a means of storing the multiple trickle charges coming from the antenna until the collections is sufficient to cause significant charging of the battery. Such a means is an intermediate storage 116, such as a low-loss capacitor or arrangement of low-loss capacitors. After the capacitor device/intermediate storage 116 builds up charge from a plurality of collected trickle charges to reach a point of significance, a charge/recharge circuit, such as a circuit having one or more diodes, allows a sudden draining of the collected charge into a rechargeable primary/main storage device 114, such as a rechargeable battery or arrangement of one or more long-term super-capacitors.

Example RFID tag 110 and other example RFID tags discussed herein are generally described along with use in a warehouse/transportation environment. In such a common scenario, RFID tags 110 are placed on movable items that need to be tracked and/or monitored, such as boxes being shipped or vehicles that regularly pass various sensors like parking unit or toll collection sensors. Of course, operations, benefits and features of trickle-charged RFID tags 110 and RFID tags in general could be described under numerous other scenarios and especially those involving movable items, such as tracking assets for a company; monitoring the usage, travel patterns and location of vehicles; maintaining accurate logistics information for military equipment and supplies; tracking natural phenomena like oceanic or atmospheric movements, etc., as well as more complex usages such as establishing ad-hoc network systems.

Figure 2:
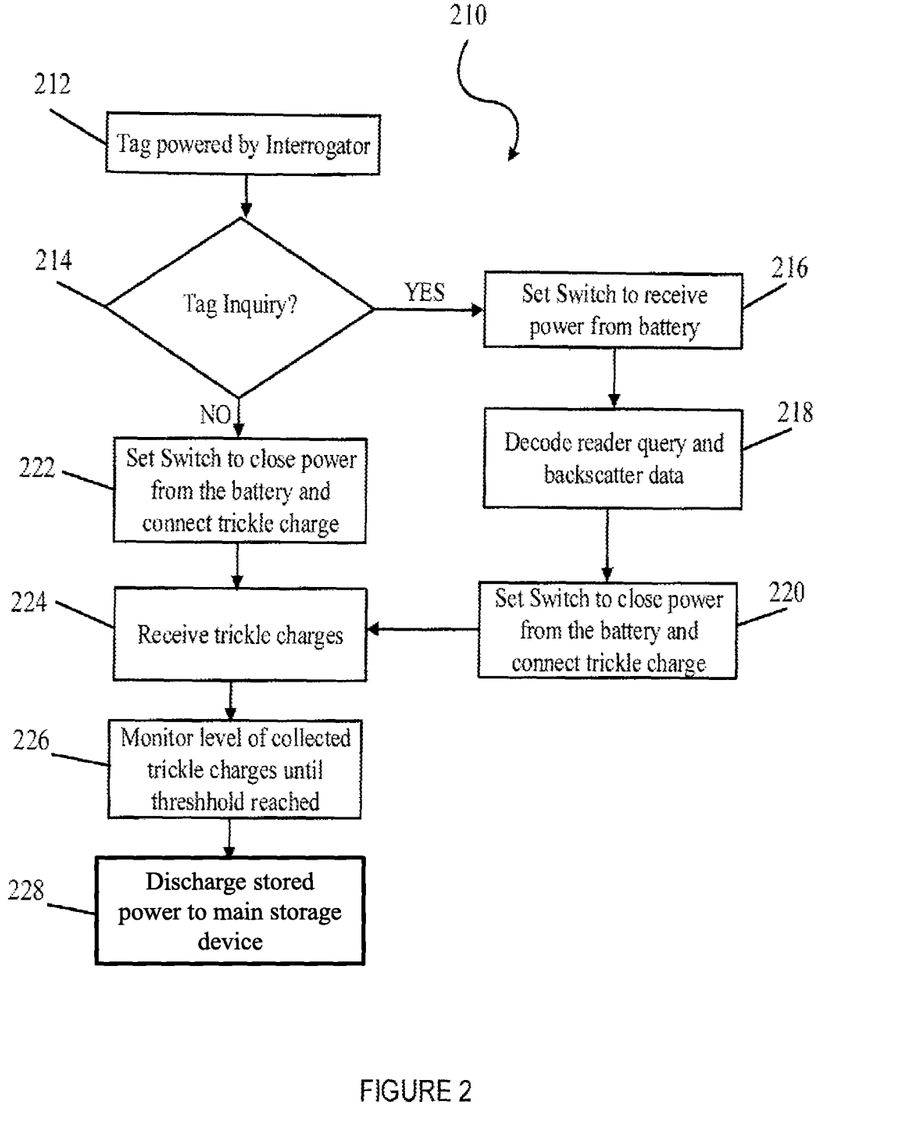
FIG. 2 illustrates a method for extending the useful life of a primary storage device of a self-powered, active or semi-passive (battery assisted passive) RFID device via collecting trickle flows in an intermediate storage device and periodically discharging the collected flows to recharge the primary storage device according to aspects and features described herein.

Referring now to FIG. 2, a method 210 is shown for extending the useful life of a primary storage device of a self-powered, active or semi-passive (battery assisted passive) RFID device via collecting trickle flows in an intermediate storage device and periodically discharging the collected flows to recharge the primary storage device. The method generally includes the step 212 of receiving at an RFID tag an interrogator signal from a RFID reader device, and step 214 of the RFID device determining whether the interrogator signal includes a Tag Inquiry for the particular RFID tag.

If YES, the interrogator signal does include a Tag Inquiry for the RFID tag, the RFID tag performs the step 216 of Setting a main switch of the RFID tag to receive power from its main storage device, which can be a battery or other storage device, such as a super-capacitor or arrangement of capacitors. The method continues with the RFID tag performing step 218 of Decoding the Tag Inquiry to determine the RFID reader's query and backscattering the data in response to the request. Afterward, the RFID tag performs the step 220 of Setting the main switch to close power from main storage and connect the power harvester to a default position for providing trickle charge flows to the intermediate storage upon receipt of interrogator signals lacking a Tag Inquiry.

If NO, the interrogator does not include a Tag Inquiry for the RFID tag, the RFID tag performs the step 222 of Maintaining Setting the main switch to close power from main storage and connect the power harvester to a default position for providing trickle charge flows to the intermediate storage upon receipt of interrogator signals lacking a Tag Inquiry. Thereafter, the method includes the step 224 of receiving trickle charges from the power harvester to the intermediate storage for the interrogator signals lacking a Tag Inquiry, and the step 226 of monitoring the level of collected trickle charges stored in intermediate storage until a threshold level is reached. When the threshold level of charge in the intermediate storage has been reached, the method includes step 228 of discharging stored power in the overall intermediate storage device to the main storage device to recharge the main storage device.

Figure 3:
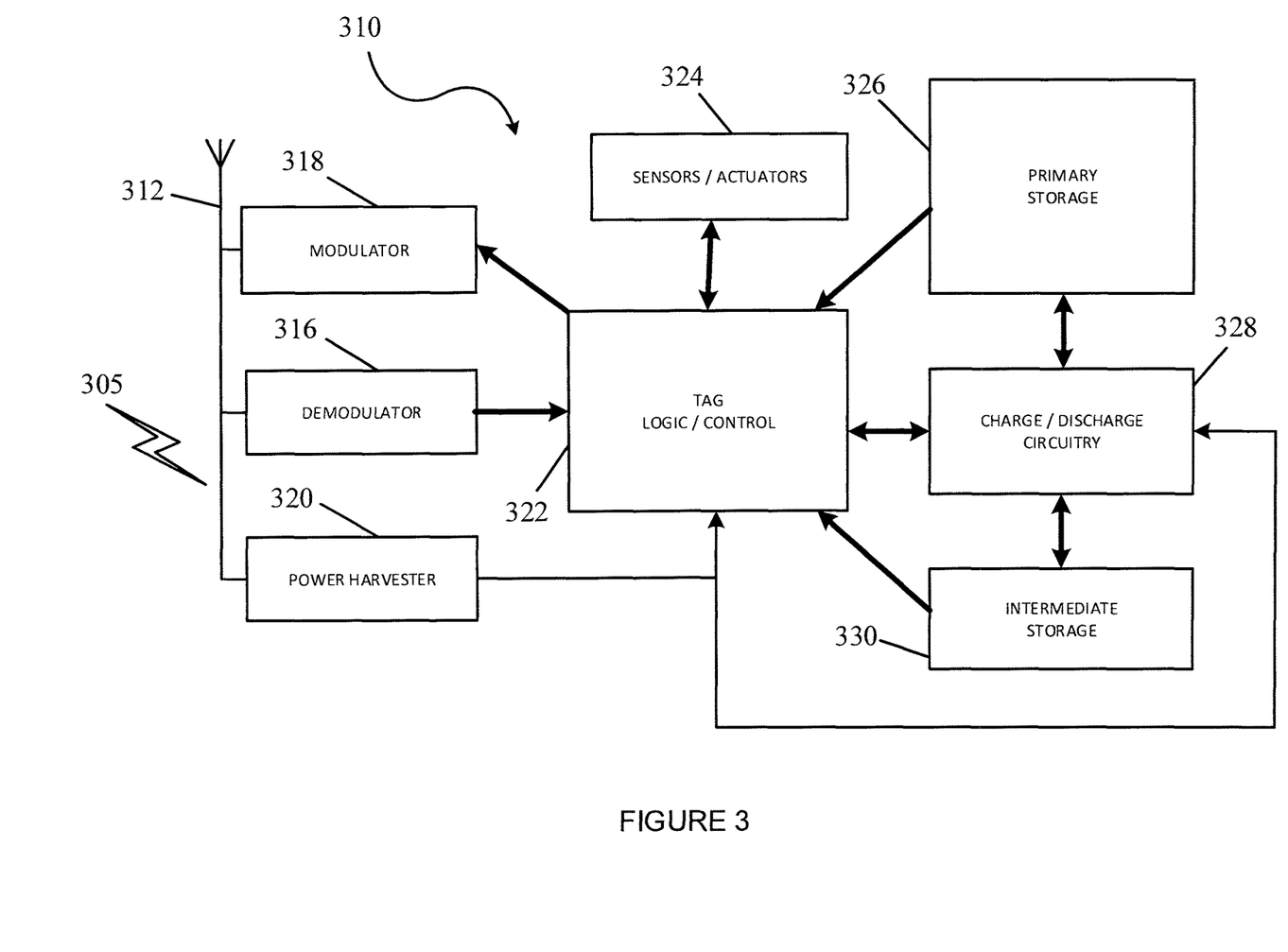
FIG. 3 shows an arrangement of example components for the RFID device of FIG. 1.

Referring now to FIG. 3, in one configuration, the active or semi-passive (battery assisted passive) RFID tag 310, such as RFID tag 110 or similar, includes a Main Antenna 312 and a Main Tag integrated circuit (IC) 322, as well as a Modulator 318, a Demodulator 316 and a Power Harvester 320 that are each connected to IC 322 and Main Antenna 312. In addition, RFID tag 310 includes a main or Primary Storage 326 for providing power when the tag is activated, actuators or Sensors 324 to detect the presence of interrogator signals or other wireless signals, and Charge/Discharge Circuitry 328 to connect Primary Storage 326 to IC 322 when activated and controlling recharging of the storage device, which are each in communication with IC 322. In addition, RFID tag 310 also includes at least one Intermediate Storage device 330, which is in communication with Charge/Discharge Circuitry 328 and is selectively connected with Primary Storage 326 when discharging collected charge into Primary Storage 326 during recharging activities.

Figure 4:
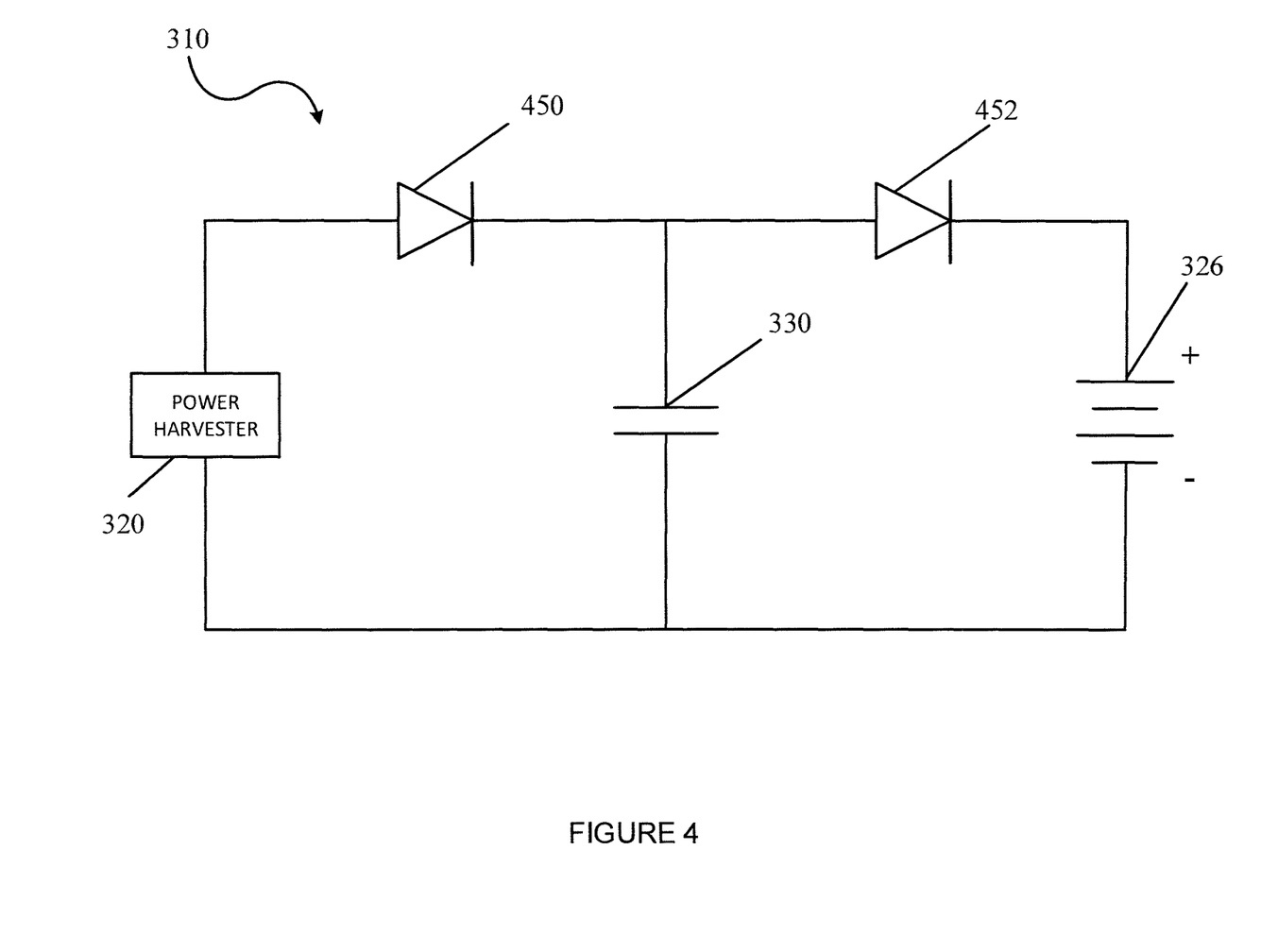
FIG. 4 shows another arrangement of example components for another RFID device.

FIG. 4 shows components of active or semi-passive (battery assisted passive) RFID tag 310 in an example circuit arrangement that includes Power Harvester 320, which periodically receives trickle flows of unused charge that are received from interrogator signals or other wireless signals that are not used immediately by RFID Tag 310 for activities occurring when in the active state. As shown, Power Harvester 320 is further connected with Intermediate Storage 330 and is selectively connected with Primary Storage 326, and also includes one or more diodes 450 and 452.

Diodes 450 and 452 permit the periodic flow of trickle charges into Intermediate Storage 330 via Diode 450 while preventing Intermediate Storage 330 from discharging into Primary Storage 326 until a pre-determined threshold of collected charge has been met in Intermediate Storage 330 via Diode 452. Once met, Diode 452 allows a portion of collected charge stored in Intermediate Storage 330 to flow into Primary Storage 326 to recharge, at least partially, the primary storage device. Diodes 450 and 452 can have preset, predetermined values that are configured for the particular RFID tag 310 and its intended functionality and desired lifespan. Alternatively, the diodes can be variable and controllable as shown hereafter in FIG. 6A.

Figure 5:
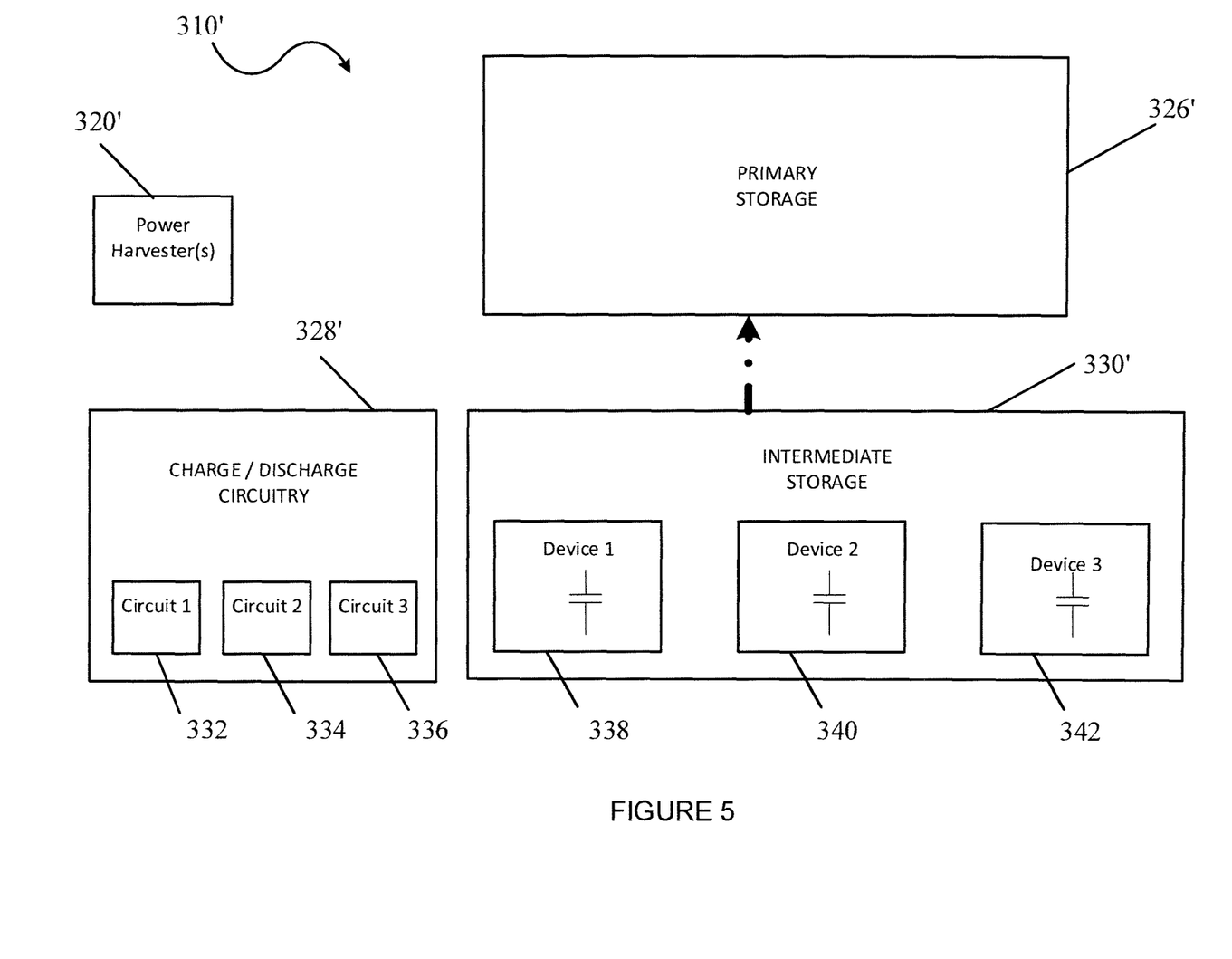
FIG. 5 shows a further arrangement of example components for a further RFID device.

Referring now to FIG. 5, components of another configuration of a RFID tag is shown as RFID tag 310', which is configured as an active or semi-passive (battery assisted passive) RFID tag that is similar to RFID tag 310 discussed above along with FIGS. 3 and 4, and which generally includes the same aspects and preferences as RFID tag 310, except as discussed hereafter. As shown, RFID tag 310' includes multiple sub-circuits or circuits 332, 334 and 336 directed to controlling charge and discharge activities for trickle flows received from multiple Power Harvesters 320', which can be configured to harvest power from multiple different interrogator signals or from other sources, such as an unmodulated RF CW from a reader.

For example, when the tag receives unmodulated RF CW signal from a reader, it can power both the main tag IC and specific switches/circuits related to the unmodulated signal without drawing power from Primary Storage 326'. Excess harvested power from the RF CW signal can be diverted as a trickle flow and be stored in a corresponding Intermediate Storage Sub-device or Device 338, 340 and 342. Similarly, RFID tag 310' can be configured to store trickle flows of charge harvested from other sources, such as different types of interrogator fields, FM wireless signals, WiFi wireless signals, etc. in corresponding Devices 338, 340 and 342. These multiple sub-stores can be stored collectively within Intermediate Storage 330' to enhance its collection rate and the rate at which collected charge can be discharged into Primary Storage 326'.

Figures 6A, 6B:
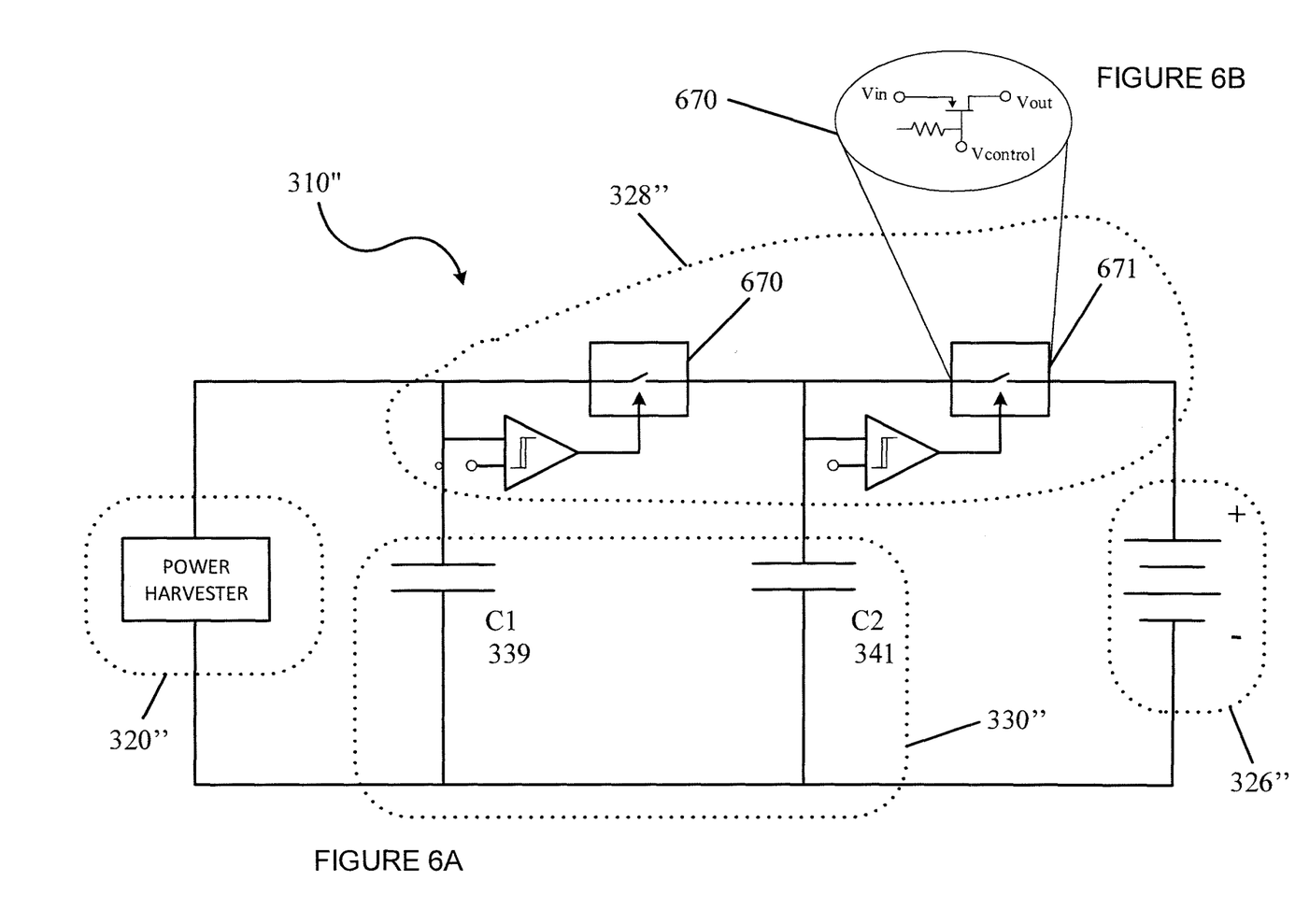
FIGS. 6A and 6B show yet another arrangement of example components for yet another RFID device.
Figure 7:
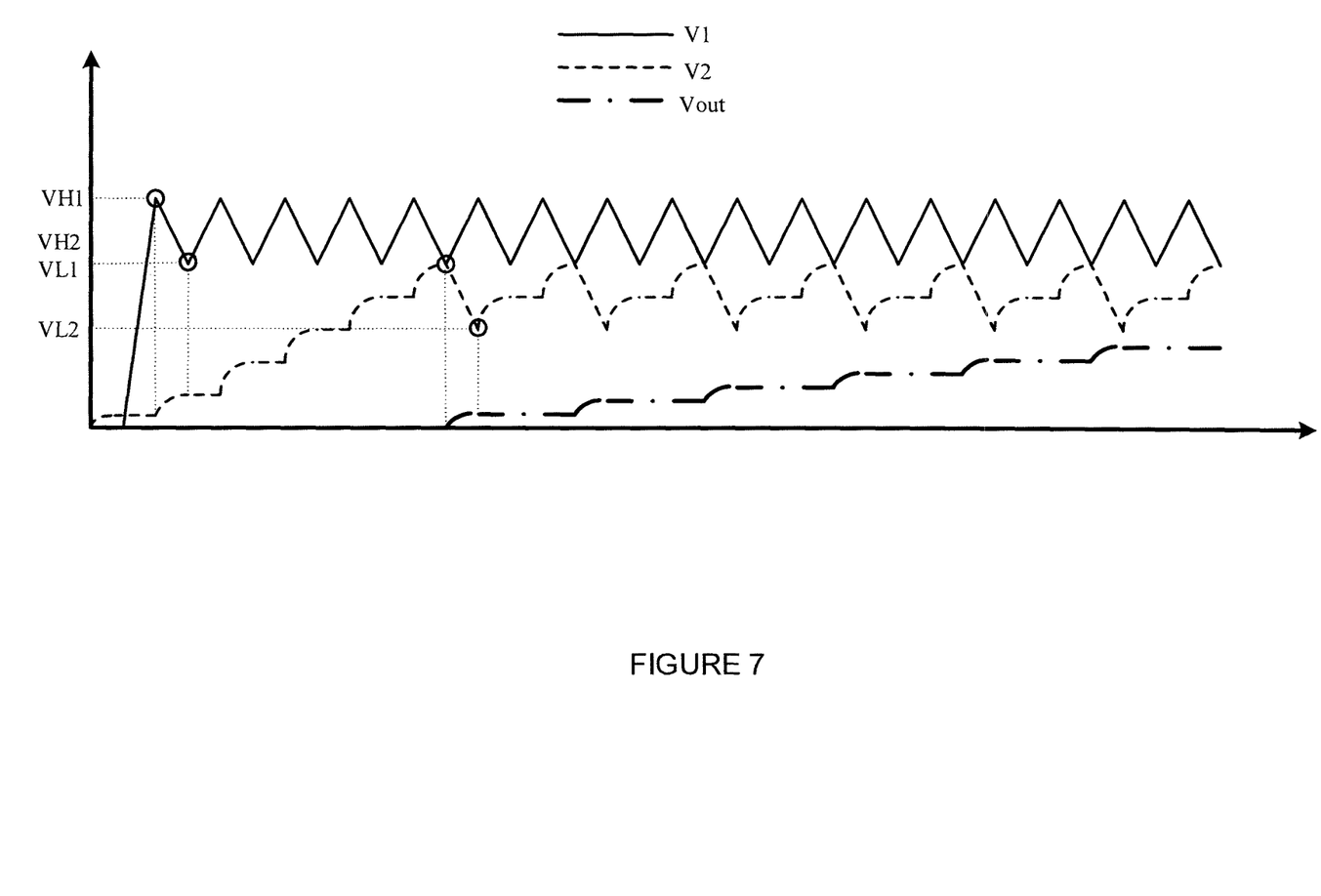
FIG. 7 shows example voltage fluctuations and charge status for the RFID device of FIGS. 6A and 6B.

FIGS. 6A, 6B and 7 depict components and features of another configuration RFID tag 310", which is configured as an active or semi-passive (battery assisted passive) RFID tag that is similar to RFID tags 310 and 310' discussed previously, and which generally includes the same aspects and preferences as RFID tags 310 and 310', except as discussed hereafter. As shown, FIG. 6A depicts components forming portions of RFID tag 310" including Charge/Discharge Circuitry 328", Power Harvester 320", Intermediate Storage 330" and Primary Storage 326". Charge/Discharge Circuit 328" includes a connection with Power Harvester 320", which can represent multiple power harvesters, from which it periodically receives trickle flows of unused charge that are received from interrogator signals or other wireless signals and are not used immediately by RFID Tag 310", such as for activities occurring when in the active state. Charge/Discharge Circuit 328" is further connected with Intermediate Storage 330" and is selectively connected with Primary Storage 326". However, Intermediate Storage 330" includes sub-storage devices 339 and 341 in the form of Capacitors C1 and C2, which can be configurations of one or more super-capacitors. Capacitor C1 can be considered part of the Power Harvester/Rf-to-DC Converter 320" and/or part of the Intermediate Storage 330". In the configuration shown in FIG. 6A, Capacitor C1 339 and Capacitor C2 341 function as Intermediate Storage 330".

Charge/Discharge Circuit 328" further includes one or more Voltage-controlled Switches 670 and 671 (FIG. 6B), which permit the periodic flow of trickle charges into Intermediate Storage 330" while preventing it from discharging into Primary Storage 326" until a pre-determined threshold of collected charge has been met in Intermediate Storage 330". Voltage-controlled Switches 670 and 671 differ from Diodes 450 and 452 discussed previously, in that their predetermined values can be variable and controllable. FIG. 7 shows example waveforms that illustrate how the respective voltages and charge levels can change over time during the receipt of trickle flows and the eventual discharge/recharge activities.

It is understood that aspects, features and benefits of the invention described herein are not unique applicable to, nor limited to, RFID networks, systems or devices. Many possibilities for implementing aspects and features of the invention described herein with other types of antenna devices and systems are possible. These and other changes can be made to the invention in light of the above Detailed Description.

While the above description describes certain examples, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms.

The flowcharts and block diagrams in the Figures illustrate the architecture, functionality, and operation of possible implementations of systems and methods according to various embodiments. In this regard, each block in the flowchart or block diagrams may represent a module, segment, or portion of code, which comprises one or more executable instructions for implementing the specified logical function (s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to embodiments of the invention in the form disclosed. Many modifications and variations will be apparent to those of ordinary skill in the art without departing from the scope and spirit of embodiments. The embodiment was chosen and described in order to explain the principles of embodiments and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments have other applications in other environments. This application is intended to cover any adaptations or variations of the present invention. The following claims are in no way intended to limit the scope of embodiments of the invention to the specific embodiments described herein.

What is claimed is:

1. A trickle-charged Radio Frequency Identification (RFID) device comprising:
   a first power harvester electrically connected with a first antenna and configured to obtain power from a first plurality of signals;
   an intermediate storage electrically connected to and configured to collect power from the first power harvester;
   a primary storage connected with the intermediate storage via a circuit configured to transfer power stored in the intermediate storage when the stored power reaches a predetermined level;
   a controller configured to: (1) close a first switch upon receipt of the first plurality of signals lacking a tag inquiry to direct power from the first power harvester to the intermediate storage until the predetermined level has been met in the intermediate storage while the circuit prevents the intermediate storage from discharging into the primary storage, and (2) control the circuit by closing a second switch so that when the predetermined level has been reached in the intermediate storage, the power in the intermediate storage is transferred from the intermediate storage to the primary storage.

2. The trickle-charged RFID device of claim 1, wherein the primary storage comprises a rechargeable battery and the intermediate storage comprises one or more capacitors.

3. The trickle-charged RFID device of claim 2, wherein the one or more capacitors comprise one or more supercapacitors and/or one or more low-loss capacitors.

4. The trickle-charged RFID device of claim 2, wherein a plurality of switches comprise one or more diodes configured to transfer automatically the stored power of the intermediate storage when the predetermined level is met and to provide a recharge burst formed from the stored power to the rechargeable battery.

5. The trickle-charged RFID device of claim 4, wherein the one or more diodes are further configured to stop the transferring of the stored power to the rechargeable battery when a predetermined low level for the stored power is reached.

6. The trickle-charged RFID device of claim 1, further comprising a main switch configured to switch from a first position connecting the intermediate storage to the first power harvester for providing a trickle charge to the intermediate storage and at least a second position connecting the primary storage to a first antenna element to provide stored power to the first antenna element while in an active mode.

7. The trickle-charged RFID device of claim 6, wherein the controller is further configured to perform actions comprising:
   the controller determines if a first one of the first plurality of signals received includes a tag inquiry for the RFID device to enter an active mode;
   if the first one of the first plurality of signals received is determined to have included the tag inquiry, then the controller switches the main switch from a first position connecting the intermediate storage to the first power harvester to a second position connecting the primary storage to the first antenna element while the first antenna element is in the active mode, and then switch the main switch back to the first position to allow power to charge the intermediate storage; and
   if the first one of the first plurality of signals received is determined to not have included a tag inquiry, then the controller maintains the main switch in the first position.

8. The trickle-charged RFID device of claim 7, further comprising a second antenna connected to a second power harvester, the second power harvester connected to the intermediate storage via a second circuit, the second power harvester being configured to obtain power from each of a plurality of unmodulated wireless signals received at the RFID device.

9. The trickle-charged RFID device of claim 8, further comprising a third antenna connected to a third power harvester, the third power harvester connected to the intermediate storage via a third circuit, the third power harvester being configured to obtain power from each of a second plurality of modulated, interrogator wireless signals received at the RFID device.

10. The trickle-charged RFID device of claim 1, further comprising:
a second antenna configured to receive a second plurality of signals; and
a second power harvester electrically connected with the second antenna and configured to obtain power from each of the second plurality of signals, wherein the intermediate storage is electrically connected to the second power harvester via a second circuit and configured to collect power from the second power harvester, the second circuit being configured to divert the power to the intermediate storage.

11. A method for extending a useful life of a main storage of a RFID device, the method comprising:
receiving a first plurality of signals, wherein the first plurality of signals include a first type of wireless signal;
receiving a second plurality of signals, wherein the second plurality of signals include a second type of wireless signal; and
directing a plurality of charges obtained from the first plurality of signals and the second plurality of signals to a first intermediate storage and a second intermediate storage by selectively closing one or more switches upon receipt of the first plurality of signals and the second plurality of signals lacking a tag inquiry; and
selectively transferring power from the first intermediate storage or the second intermediate storage to the main storage via the one or more switches.

12. The method of claim 11, wherein directing the plurality of charges obtained from the first plurality of signals and the second plurality of signals to the first intermediate storage and the second intermediate storage comprises performing the steps of:
determining if one of the first intermediate storage or the second intermediate storage has met a predetermined level of collected charge;
in response to determining that the first intermediate storage or the second intermediate storage has reached a predetermined level of collected charge:
selectively activating the first intermediate storage or the second intermediate storage to transfer power from the first intermediate storage or the second intermediate storage to the main storage via the one or more switches, thereby draining a collected plurality of trickle flows from the first intermediate storage or the second intermediate storage to the main storage when the collected charge reaches the predetermined threshold level.

13. The method of claim 11, further comprising:
monitoring a charge level of the first intermediate storage and the second intermediate storage; and
if the charge level of the first intermediate storage or the second intermediate storage reaches a predetermined threshold charge level, discharging stored power in the intermediate storage to a primary storage to recharge the primary storage.

14. The method of claim 11, wherein the one or more switches comprise voltage controlled switches that are variable and controllable.

15. A method comprising:
receiving a wireless interrogator signal from a RFID reader into a power harvester;
connecting the power harvester to an intermediate storage;
closing a first switch, upon receipt of the wireless interrogator signal lacking a tag inquiry, in order to direct power obtained from one or more signals received at the power harvester to the intermediate storage until a predetermined level has been met in the intermediate storage, wherein when the intermediate storage reaches the predetermined level, the method further comprises closing a second switch in order to transfer the power from the intermediate storage to primary storage.

16. The method of claim 15, further comprising:
determining if the received wireless interrogator signal includes a tag inquiry for the RFID device requiring it to enter an active mode in response to the wireless interrogator signal;
if yes, perform steps comprising:
switching a main switch from a first position connecting the intermediate storage to the power harvester to a second position connecting the primary storage for providing stored power out of the primary storage for use while in the active mode;
decoding the received tag inquiry;
backscattering data from the received tag inquiry; and
switching the main switch back to the first position including disconnecting the primary storage from the main switch and connecting the intermediate storage to the power harvester.

17. The method of claim 15, further comprising:
receiving a second plurality of interrogator wireless signals; and
providing a plurality of trickle charges obtained from the second plurality of interrogator wireless signals to the intermediate storage to trickle charge the intermediate storage.

18. The method of claim 15, wherein the primary storage comprises a rechargeable battery and the intermediate storage comprises one or more capacitors.

19. The method of claim 18, wherein the one or more capacitors comprise one or more super-capacitors and/or one or more low-loss capacitors.

20. The method of claim 15, wherein the first switch and the second switch are voltage controlled switches.

* * * * *